United States Patent [19]

Christoffel et al.

[11] Patent Number: 4,555,857
[45] Date of Patent: Dec. 3, 1985

[54] METHOD AND DEVICE FOR THE ACCURATE SETTING OF MACHINE TOOLS

[76] Inventors: Reinhold Christoffel, Glückaufstrasse 3; Heiner Wesoly, Schillerstrasse 7, both of D - 3203 Sarstedt, Fed. Rep. of Germany

[21] Appl. No.: 483,953
[22] PCT Filed: Jul. 22, 1982
[86] PCT No.: PCT/DE82/00153
 § 371 Date: Mar. 24, 1983
 § 102(e) Date: Mar. 24, 1983
[87] PCT Pub. No.: WO83/00551
 PCT Pub. Date: Feb. 17, 1983

[30] Foreign Application Priority Data

Jul. 28, 1981 [DE] Fed. Rep. of Germany ....... 3129590

[51] Int. Cl.⁴ .............................................. G01B 7/28
[52] U.S. Cl. ....................................... 33/561; 33/558; 33/172 E; 33/172 D; 33/169 C
[58] Field of Search ............ 33/172 D, 172 E, 169 D, 33/169 R, 174 L, 174 Q, 174 P, 174 R, 185 R, 556, 558, 559, 561

[56] References Cited

U.S. PATENT DOCUMENTS

| | | | |
|---|---|---|---|
| 2,109,976 | 3/1938 | Pierce | 33/169 C X |
| 2,451,904 | 10/1948 | Beatty | 33/169 C |
| 3,259,989 | 7/1966 | Wilson | 33/174 L |
| 3,307,267 | 3/1967 | Barr et al. | 33/174 L |
| 3,370,356 | 2/1968 | Jend | 33/172 D |
| 4,342,091 | 7/1982 | Whitehouse et al. | 33/174 L X |
| 4,386,344 | 5/1983 | Vecchiatto | 33/174 L X |

FOREIGN PATENT DOCUMENTS

| | | |
|---|---|---|
| 224777 | 7/1910 | Fed. Rep. of Germany . |
| 664215 | 8/1938 | Fed. Rep. of Germany . |
| 1477864 | 4/1969 | Fed. Rep. of Germany . |
| 1402994 | 10/1972 | Fed. Rep. of Germany . |
| 1962877 | 4/1974 | Fed. Rep. of Germany . |
| 1303702 | 11/1977 | Fed. Rep. of Germany . |
| 413396 | 12/1966 | Switzerland . |
| 1177322 | 1/1970 | United Kingdom . |

Primary Examiner—Harry N. Haroian
Attorney, Agent, or Firm—Peter K. Kontler

[57] ABSTRACT

For the accurate setting of machine tools, mechanically and electromechanically operating feeler devices are used, for example optical display means, which light up at the moment of touch contact with a surface to be machined. The accuracy of setting using these devices does not, however, satisfy the required setting accuracy in many cases. A method is provided, by means of the invention, in which a feeler head is slowly approached towards the surface or edge to be touched until the contact of the rotating feeler head with the surface or edge corresponds to a feeler head rotational angle ($\alpha$) which is greater by a predetermined safety value than 180° but is smaller than 300°. The device for this purpose consists of a housing with an electrical voltage source and circuitry equipment for optical display elements, the housing being penetrated by a hollow shaft connected with one pole of the voltage source. The hollow shaft is provided at its machine side end with an accurately ground receiving region and carries, at its free end, an electrically insulated feeler head which is connected to the input of an amplifier.

4 Claims, 2 Drawing Figures

METHOD AND DEVICE FOR THE ACCURATE SETTING OF MACHINE TOOLS

The invention concerns a method for the accurate setting of machine tools using a feeler head which is moved to touch a reference surface or edge of the workpiece to be machined and a device for carrying out the method.

For the accurate setting of machine tools with the objective of accurately determining the centre of a machine tool spindle over the workpiece to be machined, it is generally known to employ mechanically and electromechanically operating feeler devices, which are frequently also referred to as null point receivers or edge feelers. There is, for example, an apparatus which is equipped with optical display means which, however, lights up only at the moment of touch contact with a surface to be machined. Such an apparatus is equipped with a contact ball located at its lower end which triggers the signal when going down and touching the surface.

Commercially available edge feelers attain an accuracy of approximately 0.01 mm when driven in, i.e. on location finding of reference surfaces or edges. During this process, the lower part of the feeler is first pushed out of the running axis of the rotating working spindle by light finger pressure. By slow approach to the contacting surface, the oscillating movement becomes increasingly smaller. On attainment of coaxiality in the upper and lower part, the lower part is displaced along the workpiece surface. The position of the surface contacted relative to the axis of the working spindle then corresponds to the radius of the feeler head with the accuracy tolerance quoted above. However, in many cases, this does not satisfy the required setting accuracy.

The invention is based on the task of providing a new adjustment method for the most accurate setting of machine tools and a device for carrying out the method, a substantially higher setting accuracy with the smallest possible expenditure of time being attainable by this means.

The solution according to the invention is distinguished by the fact that, using a method of the type mentioned at the beginning, the feeler head is slowly approached to the surface or edge to be touched until the contact of the rotating feeler head with the surface or edge to be contacted corresponds to a rotational angle of the feeler head which is greater than 180° but smaller than 300°, $180° < \alpha < 300°$, where $\alpha$ is the contact angle, that is the angle which corresponds to the contact distance on the periphery of the feeler head. The centre of the machine tool spindle is set most advantageously, i.e. most accurately, when the contact angle = 210°.

To carry out the method according to the invention, the most suitable feeler device is one consisting of a housing with an electrical voltage source associated with it and circuitry equipment for optical display elements, the housing being penetrated by a hollow shaft connected with one of the poles of the voltage source and the hollow shaft being provided on its machine side end with an accurately ground receiving region while, at its free end, it carries an electrically insulated feeler head connected to the input of the first amplifier. Suitable optical display elements are light-emitting diodes, which can be located adjacent to one another on the outside of the housing.

The circuitry equipment preferably includes four amplifiers connected as comparators and grouped together to an integrated circuit for the same operating voltage with, connected to the negative inputs, different defined reference voltages, the positive inputs being subjected to DC pulses generated as a function of the duration of contact between the feeler head and the workpiece, the outputs of two amplifiers being each connected with a lightemitting diode and the output of one amplifier being connected with a multivibrator circuit known per se, it being possible to switch off the diodes temporarily via a transistor connection by means of the multivibrator circuit as a function of the magnitude of the DC pulses.

Further features providing advantageous embodiments of the invention may be taken from the subclaims.

The invention makes use of the fact that every machine spindle deviates within small tolerances from the theoretically accurate position, for example from the vertical. During the contact of a rotating spindle with a reference edge or surface, there is at first a quite trivial sliding contact corresponding to a very small rotational angle. On further approaching the spindle towards the workpiece, the rotational angle within which the sliding contact occurs becomes gradually greater. As soon as the hemiperiphery of the machine spindle or of a coaxial feeler head comes into contact with the workpiece, the accurate position of the spindle may be considered as having been attained. For safety reasons, however, a further thirty degrees of rotational angle are added so that the machine is considered as being optimally set at a sliding contact corresponding to 210° of rotational angle. The feeler head is first moved relative to the reference surface or edge until a contact corresponding to approximately 130° of rotational angle is obtained. One of the diodes then begins to light up. With further movement, the second light-emitting diode is switched on. At this moment, a contact corresponding to 210° of rotational angle has been achieved. If, due to lack of care, further adjustment should have been undertaken, corresponding to a contact of 300° of rotational angle, both diodes begin to blink rhythmically. This is then the sign that the spindle has been brought too close to the workpiece and that there is danger of an impermissible stress being applied to the spindle or to the tool to be used. In this case, setting must be repeated once again. The accuracy obtainable in this manner corresponds to a tolerance of ±0.002 mm, i.e. the previously attainable results are improved by the factor 5. A further advantage lies in the fact that the setting accuracy is possible even with small spindle eccentricity of the machine tool within the tolerances given above. The repeat accuracy is absolutely defined by the two light-emitting diodes excluding human reaction time. The time difference of lighting-up between light-emitting diodes which light up after one another defines the setting accuracy.

An illustrative embodiment of the invention is shown diagrammatically in the drawing and described below.

Figure 1:
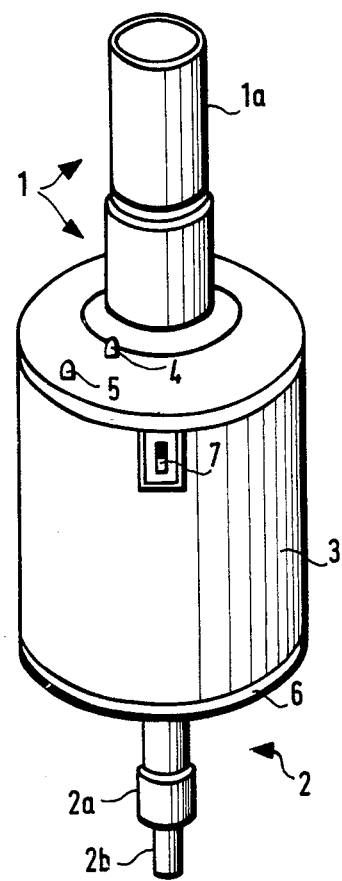
FIG. 1 shows the edge feeler equipment in diagrammatic representation.

A hollow shaft 1 with an accurately ground receiving region 1a for fastening in a machine is equipped at its lower end with a feeler head 2 for moving it up to body edges and reference surfaces. The feeler head 2 is electrically insulated against the shaft 1 and consists of a seating-type collar 2a and a rod-shaped extension 2b for making contact in openings.

The shaft 1 penetrates through a housing 3 of plastic, in which sources of electrical energy in the form of batteries are located. The upper end face of the housing 3 shows the two light-emitting diodes 4 and 5. The bottom part 6 of plastic can be screwed off for changing the batteries. The switch for switching the device on and off is indicated by 7.

Figure 2:
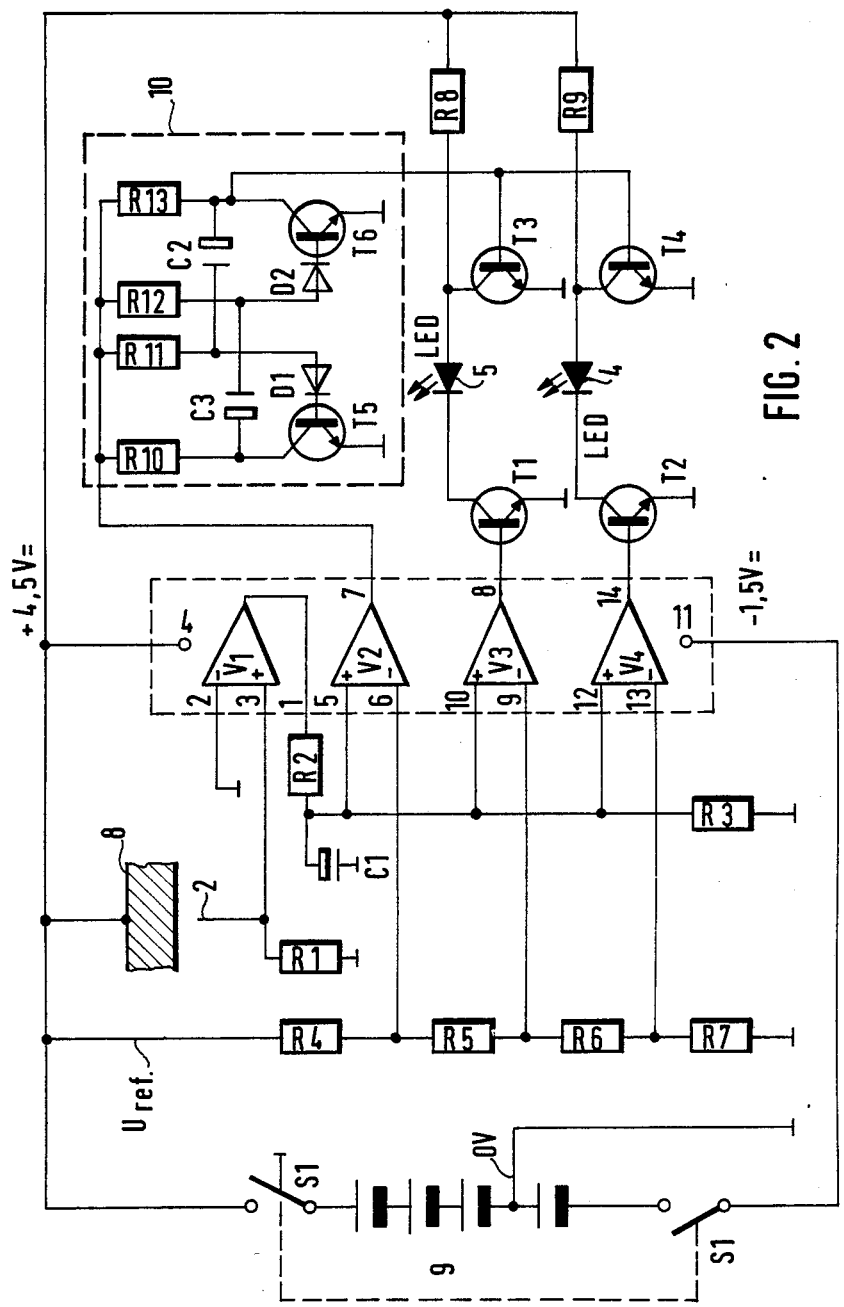
FIG. 2 shows the electronic circuit installed in the housing of the edge feeler equipment.

Using the feeler head 2, the workpiece 8 (FIG. 2) is made to approach, after the device has been switched on using the double-bridge switch S1, i.e. an operating voltage had been applied by the battery cells 9. A positive voltage reaches the workpiece via the machine chuck.

The amplifiers V1 to V4 are grouped together to an integrated circuit; they receive the same operating voltage. The grouping is shown clearly by surrounding them with dotted lines.

The amplifiers V1–V4 are designed as comparators. They react to defined reference voltages, i.e. an amplifier switches over after the appropriate reference voltage has been exceeded.

If the rotating feeler head 2 comes into contact with the workpiece 8, the amplifier V1 first receives voltage pulses. The pulses are fully amplified over the particular pulse widths, namely, over the operating voltage, which is chopped up and supplied to the condenser C1. A high or low DC voltage is produced here depending on the pulse width and this DC voltage is applied to the positive inputs of the amplifiers V2, V3 and V4. The negative inputs of these amplifiers are in contact with the defined reference voltages, corresponding to the different voltage drops. If the voltage of the positive input in each case exceeds the proportion of the negative input, i.e. the appropriate reference voltage, then the amplifier, which is connected as comparator, switches over. The amplifier V2 responds first and the amplifier V3, since its reference voltage is higher, follows. With a further increase in the positive input voltage due to further charging of the condenser C1, the amplifier V4 finally follows. The amplifiers transmit the operating voltage in the order quoted above to the transistors T1 and T2 and to a multivibrator circuit.

The amplifier V2 switches at a feeler head contact corresponding to a rotational angle of approximately 130°. At this moment, the green light-emitting diode 4 lights up. With increasing feeler head contact and, in particular, after a contact rotational angle of 210° has been exceeded, the positive input of the amplifier V3 becomes so high that the reference voltage is exceeded and the light-emitting diode 5 (red) lights up. At a contact angle of approximately 300°, the amplifier V4 switches on the multivibrator 10 which ensures that the diodes 4 and 5 are switched off in a particular rhythm via the transistors T3 and T4 and thus produce blink signals.

Depending on the duration of contact, the condenser C1 will thus be charged to a greater or lesser extent, so that the positive inputs for the amplifiers V2, V3 and V4 are more or less high and, correspondingly exceed the reference voltage.

Of importance in the present method is the fact that the deviations of the feeler head which are defined by tolerances, for example from the vertical, produce pulse-type contacts when moved towards a workpiece edge or reference surface. These deviations are thus utilized for the contact displays. The smaller the deviations from the theoretically accurate position, the smaller will be the time difference between the switching on of the light-emitting diodes in series and the transition to the blink rhythm. Thus any machine spindle can be set using the device according to the invention independent of the degree of deviation from the desired theoretically accurate position. In the case of a machine tool with zero deviation from the desired setting, the time difference between the switching-on of the light-emitting diodes in series and the transition to the blink rhythm would tend towards zero. In this manner, even extremely small deviations of a machine spindle from the absolutely accurate position can be detected using the subject of the invention.

We claim:

1. An arrangement for facilitating precise adjustment of the relative position of a stationary workpiece edge and the axis of a rotating member in a machine, comprising a sensing head arranged to be connected to and to rotate with the member of the machine, said head having a cylindrical work-contacting sensor, a housing, a source of electrical energy in said housing and a shaft having a first portion connected with one pole of said energy source and a second portion connectable with the member of the machine for rotation therewith, said sensor being provided on said shaft and said sensing head further comprising means for monitoring the duration of contact between said sensor and the edge of the workpiece per revolution of said head in response to movement of said head relative to the workpiece, said head and the member of the machine assuming an acceptable adjusted position relative to the edge of the workpiece when the duration of contact during each revolution of the head corresponds to that denoting that the contact takes place while the head turns through an angle of between 180 and 300 degrees, said monitoring means including optical indicating means of said duration of contact and said indicating means including light emitting diodes, said monitoring means further including switching means for said indicating means and said switching means comprising a plurality of amplifiers each arranged to react to a predetermined reference potential, said amplifiers including a first amplifier having an input and an output and said sensor being connected with the input of said first amplifier and having a free end electrically insulated from said shaft, said amplifiers constituting the comparators of an integrated circuit for a common operating voltage, the input of said first amplifier being a positive input and the other amplifiers having negative inputs arranged to receive different reference voltages and positive inputs arranged to receive d-c voltage impulses from the output of said first amplifier in dependency on the duration of contact between said sensor and the edge of the workpiece per revolution of said head, said diodes including a first and a second diode and said amplifiers further including second and third amplifiers having outputs each connected with a different one of said first and second diodes, said amplifiers further including a fourth amplifier having an output and said switching means further including a multivibrator circuit connected with the output of said fourth amplifier, said multivibrator circuit being arranged to periodically switch off said first and second diodes in dependency on said d-c voltage pulses, said switching means further comprising transistor means connected between said multivibrator circuit and said first and second diodes.

2. The arrangement of claim 1, wherein said first amplifier is arranged to receive amplified pulses from said sensor and said switching means further includes capacitor means interposed between said sensor and the input of said first amplifier.

3. The arrangement of claim 2, wherein said capacitor means is arranged to apply pulses to the positive inputs of said second and third amplifiers and to said multivibrator circuit.

4. The arrangement of claim 1, wherein said switching means further comprises resistors connected with the negative inputs of said second, third and fourth amplifiers to effect different drops of said operating voltage.

* * * * *